United States Patent Office 3,431,181
Patented Mar. 4, 1969

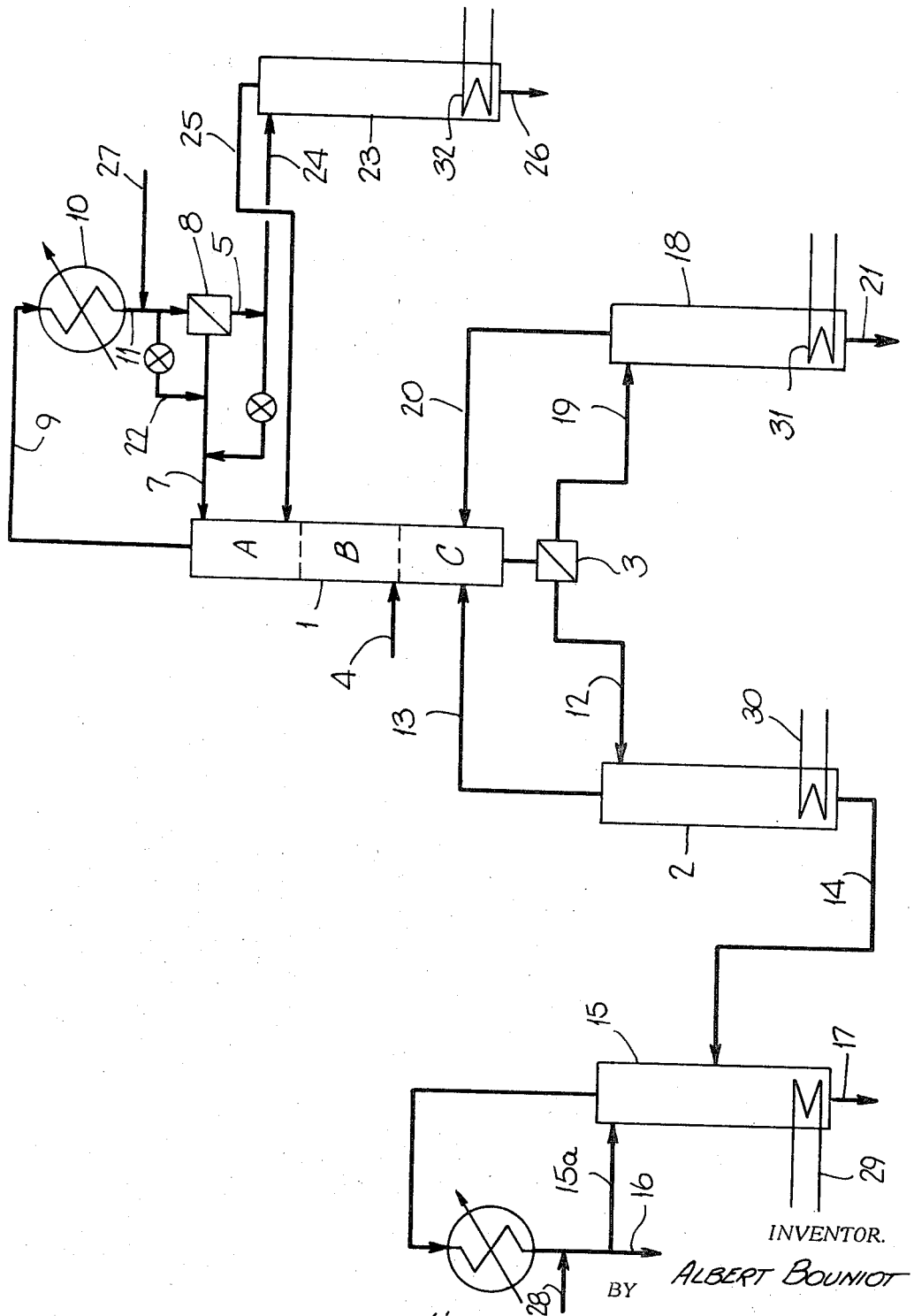
INVENTOR.
ALBERT BOUNIOT
BY
ATTORNEYS

3,431,181
METHOD OF SEPARATING METHANOL FROM LOW BOILING ALIPHATIC ESTERS AND WATER BY AZEOTROPIC DISTILLATION WITH A HYDROCARBON
Albert Bouniot, Melle, France, assignor to Melle-Bezons (Societe Anonyme), Melle, Deux-Sevres, France, a corporation of France
Filed June 14, 1967, Ser. No. 646,021
Claims priority, application France, June 22, 1966, 66,486
U.S. Cl. 203—8  16 Claims
Int. Cl. B01d *3/36;* C07c *29/28*

ABSTRACT OF THE DISCLOSURE

This disclosure describes a distillation procedure for separating methanol-low boiling aliphatic ester azeotropes and water utilizing a hydrocarbon entrainer which contains from four to seven carbon atoms and forms a low boiling azeotrope with methanol during the distillation procedure, partial refluxing of a separated methanol layer of the distillate controls the desired temperature level and composition in the lower part of the distillation column.

---

This invention is concerned with the separation and purification of azeotropic mixtures of methanol and low boiling aliphatic esters such as methyl acetate or methyl acrylate.

It is known that certain azeotropic mixtures can be separated into their constituents by distillation in the presence of an auxiliary substance, or entrainer, which forms, with one of the constituents of the original mixture, a new azeotropic mixture whose boiling point is below that of the original mixture, and below that of any azeotropic mixture which forms between the entrainer and the other constituent of the original azeotrope.

In the particular case of azeotropic mixtures containing methanol and a low boiling aliphatic ester, it is known to separate the constituents by azeotropic distillation using at least one chlorinated hydrocarbon as the entrainer. This procedure is not fully satisfactory however, because the azeotropic mixtures formed between methanol and chlorinated hydrocarbons do not, on condensation and standing, separate into two separate and distinct phases, namely a methanol rich phase and an entrainer rich phase. To effect separation by decantation it is necessary to add water to the condensed liquid mixture. This complicates the process and makes it more expensive, because the methanol product obtained after decantation is contaminated with water.

A facile and economic method has now been discovered for the separation of an azeotropic mixture containing methanol and a low boiling aliphatic ester. The separation is effected through azeotropic distillation in the presence of at least one hydrocarbon entrainer which forms a methanol-entrainer azeotrope. Suitable saturated hydrocarbons for use in the invention contain from four to seven carbon atoms in the molecule and may be straight chain, branch chain or cyclic. The preferred hydrocarbons contain five to seven carbon atoms, since the low boiling point of hydrocarbons containing only four carbon atoms necessitates the use of pressure in actual practice. This is somewhat detrimental to the convenience and economy of the invention.

Either a single hydrocarbon or a mixture of hydrocarbons can be employed. Mixtures of isomeric hydrocarbons can be used. Petroleum fractions are also convenient entrainers.

The process of the invention is applicable to the separation of methanol-ester azeotropes, i.e. azeotropic mixtures of methanol with low boiling aliphatic esters such as those having up to a total of five carbon atoms in the molecule which are derived from aliphatic alcohols and inorganic or organic, aliphatic, carboxylic acids. The organic acids and alcohols from which the esters are formed may be saturated or unsaturated, straight or branched chain, and may contain from one to four carbon atoms. Typical esters which may be separated from methanol include methyl acetate, methyl propionate, methyl isobutyrate, ethyl formate, ethyl acetate, propyl formate, isopropyl formate, isopropyl acetate, vinyl acetate, methyl acrylate, methyl methacrylate, or methyl borate.

The entrainers function by forming binary azeotropes of minimum boiling point with methanol, or ternary azeotropes of minimum boiling point with methanol and the ester. Ideally, the ternary mixture will be very poor in ester, and it is, of course, preferred to practice the invention by the formation of binary mixtures. In either case the azeotropes make it possible to remove methanol by condensing the vapors to form two distinct liquid phases, one of which is very rich in methanol. The operation is preferably carried out by withdrawing the methanol rich vapors as an overhead fraction from the top of a distillation column. By distilling and condensing the methanol-entrainer azeotrope which may contain some ester and thereafter separating the methanol rich phase from the entrainer rich phase it is possible to separate the methanol from the original mixture and to obtain it in a purified form if desired.

For most efficient operations it is recommended that the entrainer selected be one which forms a binary mixture with methanol rather than a ternary mixture so as to minimize the quantity of ester present in the head fraction of the column. Another factor which enters into the selection of the most suitable entrainer for a specific separation is the boiling point of the ester. The optimum entrainer for use in the separation of methanol from specific methanol-lower aliphatic ester azeotropes is readily determined by consideration of the principles set forth in this disclosure. For separating the components of the methanol-methyl acrylate azeotropic mixture the preferred entrainer is cyclohexane. For methanol-methyl acetate it is petroleum ether.

If the starting mixture is not anhydrous, the water can be separated by decantation in the form of a water-ester azeotrope which is withdrawn from the lower part of the separation-distillation column where there is no methanol present. If the starting mixture contains an organic substance having a boiling point above that of the ester, such organic substance can be readily separated from the ester by distillation under anhydrous conditions. Organic substances such as acrylic acid, butyl acrylate, methyl methoxy propionate and the like are often present in industrial mixtures containing a low boiling aliphatic ester and methanol.

The separation operations are desirably performed in a continuous manner in a distillation column or in a system containing a plurality of distillation columns. The mixture to be treated can be introduced in vapor or liquid condition. A particular advantage of the process of the invention is that it may be adapted to the production and purification of a variety of products in one and the same apparatus. For example, the same apparatus can be employed to prepare acrylic acid and methanol or to prepare methyl acrylate.

The invention will be more readily understood from the following description taken in conjunction with the drawing which illustrate, but without limitation, a preferred method of separating a complex mixture which contains water and an additional organic substance having a boiling point above that of the ester of the methanol-ester azeotrope.

The drawing schematically represents an apparatus comprising a distillation column which may be either one piece, or as shown in the drawing separate pieces. The separate pieces are sections 1 and 2 having a decanter 3 between them. In the apparatus as shown, decanter 3 is separate from sections 1 and 2, but if the column were one piece, decanter 3 may take the form of a decanting plate inserted in the column at the separation level between zones 1 and 2. The term "decanter" as used in this application and the appended claims is specifically intended to include within its scope any conventional apparatus or technique used to separate immiscible liquid phases.

Column section 1 during the operation comprises, from top to bottom, three successive zones, A, B, and C. Zone A is the upper portion, zone B the middle portion, and zone C the lower portion of the distillation column. Upper zone A is charged with the hydrocarbon or hydrocarbons acting as methanol entrainer and furnishing at the top of the column, the entrainer-methanol azeotropic mixture which in general can without substantial inconvenience contain a small amount of the ester from which the methanol is to be separated. Middle zone B receives through a pipe 4 the starting mixture containing the ester and methanol to be separated from one another. Zone B is kept charged with methanol-ester azeotropic mixture, on the one hand by continuously feeding such mixture through pipe 4 and, on the other hand, by continuously refluxing to the top of the column, methanol from decanter 8 through pipes 5, 6 and 7. The vapors issuing from the top of zone A through a pipe 9 are liquefied in a condenser 10 and the condensed liquid passes from condenser 10, through a pipe 11 into decanter 8 where it separates into two layers. The lower layer contains the methanol and the upper layer contains the entrainer which is sent back to the top of zone A directly through pipe 7. Control of the loading of zone B with methanol-ester azeotropic mixture is effected by maintaining, through the methanol reflux from decanter 8, a suitable temperature in zone B, i.e. substantially the boiling temperature of the methanol-ester azeotropic mixture.

Zone B serves to prevent the water in zone C (which will be discussed below) from passing upwards into zone A and the entrainer in zone A from passing downwards into zone C, because from zone C the entrainer would pass into column section 2 in which the separation from the ester would be difficult or even impossible.

Zone C, below the feeding point 4, serves to completely separate the methanol from the mixture so that the decantation can be effected while the components are still at an elevated temperature in decanter 3 in which the water-ester azeotropic mixture collects.

In column section 2 the water and methanol are completely removed from the upper, organic layer from decanter 3 which is introduced into the top portion of section 2 through a pipe 12. Through a pipe 13 the head vapors from column section 2 containing water, methanol and low boiling aliphatic ester are returned into the base portion of zone C. The ester is withdrawn from the base of column section 2 through a pipe 14. It may be collected as it stands or, if it is in admixture with another organic substance from which it should be separated, the mixture is subjected to distillation in a column 15 in which one of the two constituents is separated as a head product and withdrawn through a pipe 16 while the other constituent is separated as a tail product and withdrawn through a pipe 17. Pipe 15a is a condensate reflux pipe for returning a portion of the condensate.

A column 18 (optional) serves to completely separate the ester and methanol from the lower, aqueous layer from decanter 3 which is introduced into column 18 through a pipe 19. The ester and methanol are returned through a pipe 20 into the base portion of zone C and the water is discarded through a pipe 21.

Preferably decanter 8 is cooled, for example it is maintained at room temperature, i.e. 20–25° C., so as to ensure efficient decantation of the methanol as a lower layer. Temperatures slightly above room temperature or, more desirably, lower than room temperature can also be utilized. A suitable temperature range would be from about 15° C. to about 30° C. The lower the temperature of decanter 8, the lower the proportion of entrainer retained in the methanol of the lower layer. It is possible to cool, in decanter 8, only that portion of head distillate from section 1 from which the lower layer should be separated and withdrawn through pipes 5 and 24, the remainder of the distillate, in such a procedure, being by-passed through a pipe 22.

A column 23 (optional) serves to completely separate the entrainer, and the ester if any, from the methanol lower layer from decanter 8 which is introduced into column 23 through pipes 5 and 24. The entrainer and ester if any are withdrawn from the top of column 23 through a pipe 25, the entrainer being in the form of an azeotropic mixture with methanol. The remainder of the methanol is withdrawn in pure state from the base of column 23 through a pipe 26. The head vapors from column 23 are introduced into column section 1, at the base of zone A. Section 1 also receives, as aforesaid, the head vapors from column section 2 and column 18. Section 1 is the unit of the plant which requires the most important heat supply.

Heaters 29, 30, 31 and 32 are employed in columns 15, 2, 18 and 23 respectively to aid in temperature control.

The relative dimensions of the various items of the plant will, of course, depend upon the composition of the starting mixture to be treated and the kind of entrainer used.

When the ester in the starting mixture to be treated is a polymerizable compound (for example, methyl acrylate), it is recommended to introduce a stabilizing agent into the plant. Hydroquinone dissolved in methanol, or any other conventional stabilizing agent may be employed. This introduction is advantageously done into the top portion of column section 1, through a pipe 27 opening in pipe 11, and into the top portion of column 15, through a pipe 28.

It has been further found in accordance with the present invention that for more efficiently avoiding undesirable polymerization reactions in the case of unsaturated polymerizable esters, such as vinyl acetate, methyl acrylate or methyl methacrylate, it is advisable to introduce, preferably continuously, a small amount of an aqueous solution of a water-soluble copper salt to the upper part of the bottom portion of the main distillation column in which is carried out the distillation of the starting mixture to be separated into its constituents, i.e. zone C of column 1.

Effectively, in zone C and in underlying decanter 3 a hot aqueous liquid is present, which is saturated with polymerizable ester and which contains no stabilizing agent because the organic stabilizers, such as hydroquinone, which are introduced to the top of column 1 are extracted from the aqueous phase by the organic phase.

Preferably the introduction of aqueous solution of copper salt to the upper part of zone C is so controlled that the aqueous layer (lower layer) withdrawn from decanter 3 by pipe 19 contains from about 0.035% to 2%, most preferably 0.2 to 0.4% by weight of copper.

For effecting this introduction there is preferably used either a copper salt of a lower aliphatic carboxylic organic acid containing up to eight carbon atoms, for example cupric acetate, 2-ethyl hexanoate or acrylate, or a stable copper salt of an inorganic mineral acid, which does not oxidize under the operating conditions. Suitable salts include, for example cuprous chloride, cupric chloride or cupric sulfate.

It has been further found in accordance with the present invention that for still more efficiently avoiding undesirable polymerization reactions in the case of unsaturated polymerizable esters, it is advisable to also introduce, preferably continuously, a small amount of a water-soluble copper salt in aqueous solution to the upper part of the column 2 in which is carried out the distillation of the organic layer (upper layer) withdrawn from the decanter 3 by the pipe 12.

Effectively, the copper salt which, in accordance with the present invention, is introduced to zone C is removed in the lower layer withdrawn from decanter 3 by pipe 19, and accordingly does not pass to column 2 and subsequent column 15. As the bottom of column 2 and column 15 is at a comparatively high temperature, the hydroquinone or other organic stabilizer introduced by pipes 27 and 28 is no longer sufficiently efficient to prevent polymerization reactions.

Preferably the introduction of aqueous solution of copper salt to the upper part of column 2 is so controlled that the liquid mixture in the bottom part of this column contains from about 0.03% to 0.18%, most preferably from 0.05% to 0.07% by weight of copper.

For effecting this introduction there is preferably used a copper salt of a lower aliphatic carboxylic organic acid containing up to eight carbon atoms, for example cupric acetate, 2-ethyl hexanoate or acrylate.

The following example is given by way of illustration only and should not be construed as a limitation of this invention, many apparent variations of which are possible without departing from the spirit and scope thereof.

Example

A laboratory scale apparatus utilizing the items illustrated in the drawing is employed to separate the components of a methanol, methyl acrylate, methyl methoxy propionate, water mixture using various entrainers.

Methanol and methyl acrylate form a homogeneous azeotropic mixture with a minimum boiling point of 62.5° C. Cyclohexane, which forms with methanol a binary azeotropic mixture distilling at 55° C., has been found, in actual practice, to be especially desirable as a methanol entrainer in this case, but the other hydrocarbons belonging to the above defined group can also be successfully used, as will be shown below.

Where the starting mixture to be treated contains water, the water forms with methyl acrylate a decantable azeotropic mixture distilling at 70° C.

Methanol and methyl acrylate-containing industrial mixtures from which the constituents can be separated from one another by the process of the invention are produced, more particularly, through esterification of acrylic acid by methanol, transesterification of methyl acrylate by ethanol, butanol, isobutanol or ethylene glycol, conversion of methoxy propionic acid into methyl acrylate and methanol, or into a mixture of acrylic acid, methanol and methyl acrylate, conversion, by an alcohol, of methoxy propionic acid into the acrylic ester of said alcohol, or else hydrolysis of methyl acrylate.

As a particular example there will be considered the treatment of a mixture produced by conversion of methoxy propionic acid into methyl acrylate and methanol and containing by weight, about:

40% of methyl acrylate
40% of methanol
10% of methyl methoxy propionate
10% of water This mixture, in liquid condition, is introduced continuously into the apparatus described above and is treated therein as explained above, with introduction of a solution of hydroquinone in methanol into the plant through pipes 27 and 28. There is also introduced an aqueous solution of copper acetate, on the one hand to the upper part of zone C so that the aqueous layer withdrawn from decanter 3 by pipe 19 contains about 0.85% by weight of this salt and on the other hand to the upper part of column section 2 so that the liquid mixture at the foot of this column section contains about 0.17% by weight of this salt.

The distillation columns are provided with perforated plates having an efficiency of about 30% of theory. The apparatus is operated continuously.

The columns have the following constitution:

| | Plates |
|---|---|
| Column 1 | 30 |
| Column 2 | 6 |
| Column 18 | 5 |
| Column 15 | 10 |
| Column 23 | 10 |

It will be noted that the number of plates is lower and the heat requirements higher than would be employed in an industrial apparatus.

For sake of illustration, at running equilibrium, the following temperatures are measured (° C.) where the entrainer used is cyclohexane:

| | Degrees |
|---|---|
| Column 1: | |
| Fifth plate (from the bottom) | 71 |
| 18th plate | 60 |
| 30th plate | 55 |
| Column 2: | |
| Bottom | 90 |
| 3rd plate | 80 |
| 6th plate | 75 |
| Column 15: | |
| Bottom | 145 |
| 8th plate | 78 |
| Column 18: | |
| Bottom | 100 |
| Column 23: | |
| Bottom | 66 |
| 8th plate | 57 |

The throughputs and compositions of the fluids in the pipes of the apparatus are given in the following table:

| Pipe No. | Methyl acrylate (g./hr.) | Methanol (g./hr.) | Methyl methoxy propionate (g./hr.) | Water (g./hr.) | Cyclohexane (g./hr.) |
|---|---|---|---|---|---|
| 4 | 120 | 12 | 30 | 30 | 0 |
| 16 | 113 | 0.5 | 0 | 0.5 | 0 |
| 17 | 2 | 0 | 30 | 0 | 0 |
| 21 | 0 | 0 | 0 | 29.5 | 0 |
| 26 | 5 | 119.5 | 0 | 0 | 0 |
| 14 | 115 | 0.5 | 30 | 0.5 | 0 |
| 19 | 3 | 3 | 0 | 42 | 0 |
| 5 | 15 | 165 | 0 | 0 | 30 |
| 6 | 15 | 165 | 0 | 0 | 30 |
| 7 | 12 | 60 | 0 | 0 | 300 |

It will be apparent that a very efficient separation of the components of the mixture is realized.

Table I below gives, for various entrainers, the partial and total heating steam consumption per kg. of methyl acrylate treated.

TABLE I

| Entrainer | Steam consumption (kg.) per kg of acrylate | | | | |
|---|---|---|---|---|---|
| | Section 2 | Column | | | Total |
| | | 23 | 18 | 15 | |
| Petroleum ether | 3.50 | 0.15 | 9.10 | 0.30 | 4.35 |
| n-Hexane | 1.5 | 0.17 | 0.10 | 0.30 | 2.40 |
| Cyclohexane | 0.95 | 0.12 | 0.10 | 0.30 | 1.77 |
| n-Heptane | 1.11 | 0.20 | 0.10 | 0.30 | 1.71 |
| Methyl cyclohexane | 0.84 | 0.32 | 0.10 | 0.30 | 1.56 |

The number of theoretical plates in the various distilling items of the plant is substantially as indicated in Table II below.

TABLE II

| Entrainer | Plant items | | | | |
|---|---|---|---|---|---|
| | Section | | Column | | |
| | 1 | 2 | 23 | 18 | 15 |
| Petroleum ether | 10 | 5 | 5 | 5 | 6 |
| n-Hexane | 20 | 6 | 7 | 5 | 6 |
| Cyclohexane | 25 | 8 | 10 | 5 | 6 |
| n-Heptane | 35 | 7 | 15 | 5 | 6 |
| Methyl cyclohexane | 40 | 10 | 20 | 5 | 6 |

Taking into account the data of these two tables, it is found that, of the above five entrainers, cyclohexane is the most advantageous in the case of methyl acrylate.

It is possible to return directly to the reactor which produces the starting mixture to be treated (which reactor is not shown in the drawing) the whole or part of the lower layer from decanter 8 (raw methanol) without passing it through column 23. The latter, accordingly, can be dispensed with. The methyl methoxy propionate withdrawn from the base of column 15 is also returned to the reactor.

For producing, with a similar plant, acrylic acid and methanol, instead of methyl acrylate, from methoxy propionic acid, the lower, aqueous layer from decanter 3 and the methyl acrylate withdrawn through pipe 16 are returned directly to the reactor. The acrylic acid is collected at the base of column 15 and withdrawn through pipe 17. Under such circumstances column 18 can be dispensed with.

For producing, with a similar plant, butyl acrylate from methoxy propionic acid and butanol, the methyl acrylate withdrawn through pipe 16 is returned to the reactor, while the butyl acrylate is collected at the base of column 15 and withdrawn through pipe 17.

What is claimed is:

1. A continuous process for separating methonal from a mixture containing same together with low-boiling aliphatic esters, with which methanol forms azeotropes, and water, which process comprises the steps of
    (1) distilling said mixture in a distillation column in the presence of at least one saturated hydrocarbon containing from four to seven carbon atoms which is an entrainer for methanol and forms a methanol-entrainer azeotrope having a boiling point lower than the boiling point of said methanol-ester azeotrope, and separating said methanol-hydrocarbon azeotrope as an overhead fraction,
    (2) condensing at least a part of said methanol-entrainer azeotrope to form a methanol-rich phase and an entrainer-rich phase,
    (3) refluxing a portion of the methanol-rich phase to the distillation column,
    (4) withdrawing ester from the lower part of said distillation column as a water-ester azeotrope.

2. A process as in claim 1, including the additional steps of
    (5) separating at an elevated temperature the water-ester azeotrope obtained in step 4 into a water-rich phase and an ester-rich phase, and
    (6) recovering the ester from the ester-rich phase by distillation.

3. A process as in claim 1 in which the methanol-entrainer azeotrope is a binary mixture.

4. A process as in claim 1 in which the methanol-entrainer azeotrope is a ternary mixture.

5. A process as in claim 1 in which the ester contains up to five carbon atoms and is derived from an aliphatic alcohol containing from one to four carbon atoms and an organic aliphatic carboxylic acid containing from one to four carbon atoms.

6. A process as in claim 5 in which the ester is methyl acetate, methyl propionate, methyl isobutyrate, ethyl acetate, isopropyl formate, isopropyl acetate, vinyl acetate, methyl acrylate or methyl methacrylate.

7. A process as in claim 1 in which at least a portion of the entrainer from the methanol-entrainer azeotrope is returned to the upper portion of the distillation column.

8. A process as in claim 1 in which the ester is unsaturated and polymerizable, and a small amount of a water-soluble copper salt is added to the distillation column.

9. A process as in claim 2 in which the ester is unsaturated and polymerizable, and a small amount of a water solution of a copper salt is added to the ester-rich phase obtained by decantation of step 5, to inhibit polymerization during distillation of the ester.

10. A process as in claim 8 in which the copper salt is a salt of a lower aliphatic carboxylic organic acid.

11. A process as in claim 9 in which the copper salt is a salt of a lower aliphatic carboxylic organic acid.

12. A process as in claim 10 in which the copper salt is cupric acetate, cupric acrylate or cupric 2-ethyl-hexanoate.

13. A process as in claim 11 in which the copper salt is cupric acetate, cupric acrylate or cupric 2-ethyl-hexanoate.

14. A process as in claim 2 in which the ester is methyl acrylate and the hydrocarbon is cyclohexane.

15. A process as in claim 1 in which the ester is methyl acetate and the hydrocarbon is pentane.

16. A process as in claim 1 in which the ester is methyl acetate and the hydrocarbon is petroleum ether.

References Cited

UNITED STATES PATENTS

| | | | |
|---|---|---|---|
| 2,406,561 | 8/1946 | Rehberg | 203—70 |
| 2,407,861 | 9/1946 | Wolk | 203—9 |
| 2,475,094 | 7/1949 | Hillyer et al. | 203—8 |
| 2,476,205 | 7/1949 | McCants | 203—52 |
| 2,476,206 | 7/1949 | McCants | 203—68 |
| 2,591,877 | 4/1952 | Robertson et al. | 203—68 |
| 2,650,249 | 8/1953 | Mention | 260—643 |
| 2,787,636 | 4/1957 | Alheritiere et al. | 260—499 |
| 2,936,321 | 5/1960 | Mercier | 260—643 |
| 3,011,954 | 12/1961 | Halpern et al. | 203—70 |
| 3,239,572 | 3/1966 | Zinsstag | 203—70 |

WILBUR L. BASCOMB, Jr., *Primary Examiner.*

U.S. Cl. X.R.

203—18, 52, 60, 68, 70, 82, 84; 252—400; 260—486, 499, 643